(12) United States Patent
Fontenot et al.

(10) Patent No.: US 9,201,642 B2
(45) Date of Patent: Dec. 1, 2015

(54) EXTENDING PLATFORM TRUST DURING PROGRAM UPDATES

(71) Applicant: International Business Machines Corporation, Armonk, NY (US)

(72) Inventors: Nathan D. Fontenot, Georgetown, TX (US); Joel H. Schopp, Austin, TX (US); Michael T. Strosaker, Austin, TX (US); George C. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/843,726

(22) Filed: Mar. 15, 2013

(65) Prior Publication Data

US 2014/0279985 A1   Sep. 18, 2014

(51) Int. Cl.
| | |
|---|---|
| *G06F 7/00* | (2006.01) |
| *G06F 17/30* | (2006.01) |
| *G06F 9/445* | (2006.01) |
| *G06F 21/51* | (2013.01) |
| *G06F 21/57* | (2013.01) |

(52) U.S. Cl.
CPC ........ *G06F 8/65* (2013.01); *G06F 21/51* (2013.01); *G06F 21/57* (2013.01)

(58) Field of Classification Search
None
See application file for complete search history.

(56) References Cited

U.S. PATENT DOCUMENTS

| | | | | |
|---|---|---|---|---|
| 5,944,821 | A  * | 8/1999  | Angelo | 726/22 |
| 6,922,782 | B1 * | 7/2005  | Spyker et al. | 713/161 |
| 7,934,197 | B2 | 4/2011  | Thorell | |
| 2002/0040436 | A1 * | 4/2002  | Davis et al. | 713/189 |
| 2002/0099952 | A1 * | 7/2002  | Lambert et al. | 713/200 |
| 2006/0064582 | A1 * | 3/2006  | Teal et al. | 713/156 |
| 2006/0123465 | A1 * | 6/2006  | Ziegler | 726/2 |
| 2006/0130144 | A1 * | 6/2006  | Wernicke | 726/24 |
| 2006/0277410 | A1 * | 12/2006 | Jajodia et al. | 713/176 |
| 2007/0067634 | A1 * | 3/2007  | Siegler | 713/171 |
| 2007/0136297 | A1 | 6/2007  | Choe | |
| 2008/0045342 | A1 * | 2/2008  | Crowder et al. | 463/42 |
| 2008/0092235 | A1 * | 4/2008  | Comlekoglu | 726/22 |
| 2008/0183996 | A1 * | 7/2008  | Field et al. | 711/163 |
| 2009/0086974 | A1 * | 4/2009  | Murase et al. | 380/277 |
| 2009/0307487 | A1 * | 12/2009 | Movva et al. | 713/156 |
| 2010/0275026 | A1 * | 10/2010 | McLean | 713/176 |
| 2011/0191747 | A1 * | 8/2011  | Charisius et al. | 717/103 |

FOREIGN PATENT DOCUMENTS

WO          0225428          3/2002

* cited by examiner

*Primary Examiner* — Hexing Liu
(74) *Attorney, Agent, or Firm* — VanLeeuwen & VanLeeuwen; Damion C. Josephs

(57) ABSTRACT

An approach is provided in which a computer system generates a current hash value of a computer program in response to receiving a request to execute the computer program. Next, the computer system determines that the current hash value fails to match a reference hash value that was previously generated subsequent to installing the computer program on the computer system. Since the two hash values do not match each other, the computer system matches the current hash value to an updated hash value that was previously generated in response to modifying the computer program on the computer system. In turn, the computer system executes the computer program when the current hash value matches the updated hash value.

17 Claims, 6 Drawing Sheets

EXTENDING PLATFORM TRUST DURING PROGRAM UPDATES

BACKGROUND

The present disclosure relates to extending platform trust during program updates. More particularly, the present disclosure relates to utilizing a program modification module in conjunction with an integrity measurement module to optimize computer program loading performance within a computer system's trusted computing environment.

Computer systems execute computer programs that may utilize dependent data, such as libraries, during program execution. The computer system may also include a trusted computing environment that assures the integrity of the computer programs and their dependent data. The trusted computing environment may be managed by an integrity measurement module, which checks a computer program's integrity prior to executing the computer program.

In one embodiment, the dependent data (or links to the dependent data) may be integrated into the computer program when the program is compiled (static linking). In another embodiment, the dependent data may be integrated into the computer program (or links to the dependent data) when the computer program loads for execution (dynamic linking). In this embodiment, the computer program is temporarily modified during program execution with the dynamic linking information and, after the computer program finishes executing, the computer program reverts back to its original form to maintain the computer program's integrity within the trusted computing environment.

BRIEF SUMMARY

According to one embodiment of the present disclosure, an approach is provided in which a computer system generates a current hash value of a computer program in response to receiving a request to execute the computer program. Next, the computer system determines that the current hash value fails to match a reference hash value that was previously generated subsequent to installing the computer program on the computer system. Since the two hash values do not match each other, the computer system matches the current hash value to an updated hash value that was previously generated in response to modifying the computer program on the computer system. In turn, the computer system executes the computer program when the current hash value matches the updated hash value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
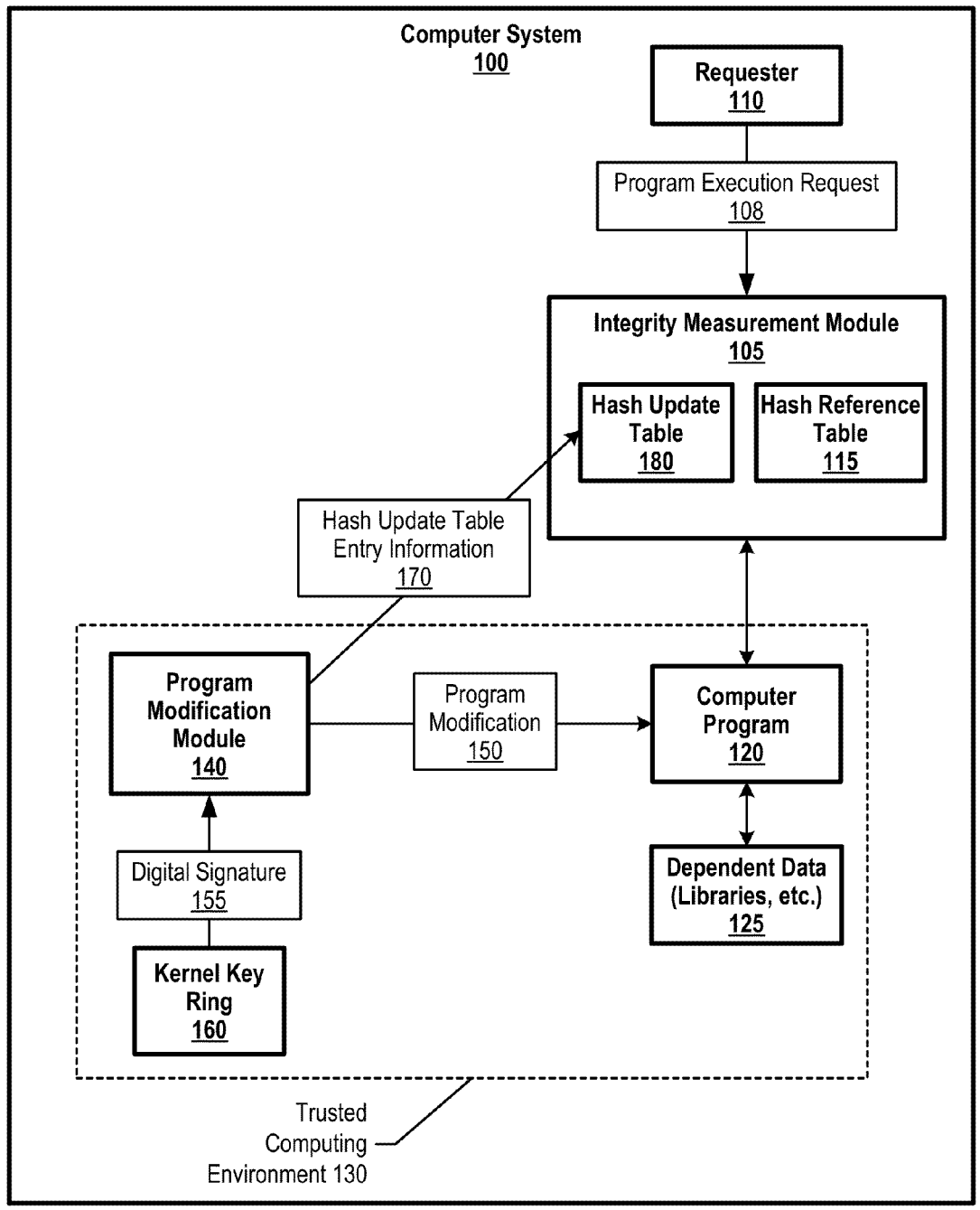
FIG. 1 is a diagram showing a program modification module updating a computer program and providing a digitally signed updated hash value to an integrity measurement module for validating the computer program's trustworthiness prior to executing the computer program.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing a program modification module updating a computer program and providing a digitally signed updated hash value to an integrity measurement module for validating the computer program's trustworthiness prior to executing the computer program. As defined herein, a hash value may be any identifier that is derived from a computer program's content (e.g., hash value, checksum, hash codes, etc.).

Although this disclosure utilizes hash values to verify program integrity, one skilled in the art would understand that other approaches may be utilized to verify program integrity (e.g., checksums, etc.).

Computer system 100 installs computer program 120 and dependent data 125 (e.g., libraries) onto trusted computing environment 130. During the installation process (or shortly thereafter), integrity measurement module 105 generates a "reference" hash value of computer program 120. In turn, integrity measurement module 105 stores the reference hash value in a table entry located in hash reference table 115. Integrity measurement module 105 also stores a program identifier in the table entry that identifies computer program 120.

As discussed below, integrity measurement module 105 utilizes the stored reference hash value as a basis for verifying the integrity of computer program 120 during subsequent program execution requests. For example, when integrity measurement module 105 receives program execution request 108 from requestor 110, integrity measurement module 105 generates a current hash value of computer program 120 and compares the current hash value with the reference hash value stored in hash reference table 115. When the current hash value matches the reference hash value, integrity measurement module 105 determines that the computer program 120 may be trusted (e.g., was not altered or compromised) and, in turn, safe to execute. As those skilled in the art can appreciate, requestor 110 may be another computer program or a user interface that receives input from a user to execute computer program 120.

When computer system 100 loads computer program 120 and dependent data 125 for execution, computer system 100 may dynamically link computer program 120 with dependent data 125, thus temporarily modifying computer program 120 during program execution. Program modification module 140 tracks such modifications and, after the program finishes executing, program modification module 140 updates computer program 120 with the program modifications. As such, computer program 120 loads and executes faster the next time that integrity measurement module 105 receives a request to execute computer program 120.

However, since computer program 120 is now modified from its original form, program modification module 140 generates an updated hash value for computer program 120 (after program modifications) and stores the updated hash value (hash update table entry information 170) in hash update table 180. In order to assure the integrity of program modification module 140, program modification module 140 receives digital signature 155 from key kernel ring 160 and includes the digital signature in hash update table entry information 170, which is stored with the updated hash value. Program modification module 140 also includes computer program 120's program identifier in hash update table entry information 170, which is stored with the updated hash value and the digital signature (see FIG. 2 and corresponding text for further details).

When integrity measurement module 105 receives another program execution request 108 from requestor 110 (or other requestor), integrity measurement module 105 generates a new current hash value of computer program 120, which is now modified, and determines that the current hash value fails to match the reference hash value stored in hash reference table 115. As such, integrity measurement module 105 checks to see if hash update table 180 includes a table entry that includes a program identifier matching computer program 120's program identifier.

When integrity measurement module 105 locates a match, integrity measurement module 105, in one embodiment, validates the digital signature stored in the table entry to verify that a trusted source (program modification module 140) generated the table entry. After integrity measurement module 105 validates the digital signature, integrity measurement module 105 retrieves the updated hash value from the table entry and compares the updated hash value to the newly generated current hash value. When the updated hash value and the current hash value match, integrity measurement module 105 determines that computer program 120 may be trusted and, in turn, loads and executes computer program 120.

In addition, integrity measurement module 105 replaces the "old" reference hash value in hash reference table 115 with the updated hash value stored in hash update table 180, thus becoming the new reference hash value. As a result, the next time that integrity measurement module 105 receives a request to execute computer program 120, integrity measurement module 105 generates a new current hash value and matches the newly generated current hash value with the new reference hash value (e.g., updated hash value) stored in hash reference table 115 (see FIG. 2 and corresponding text for further details).

Figure 2:
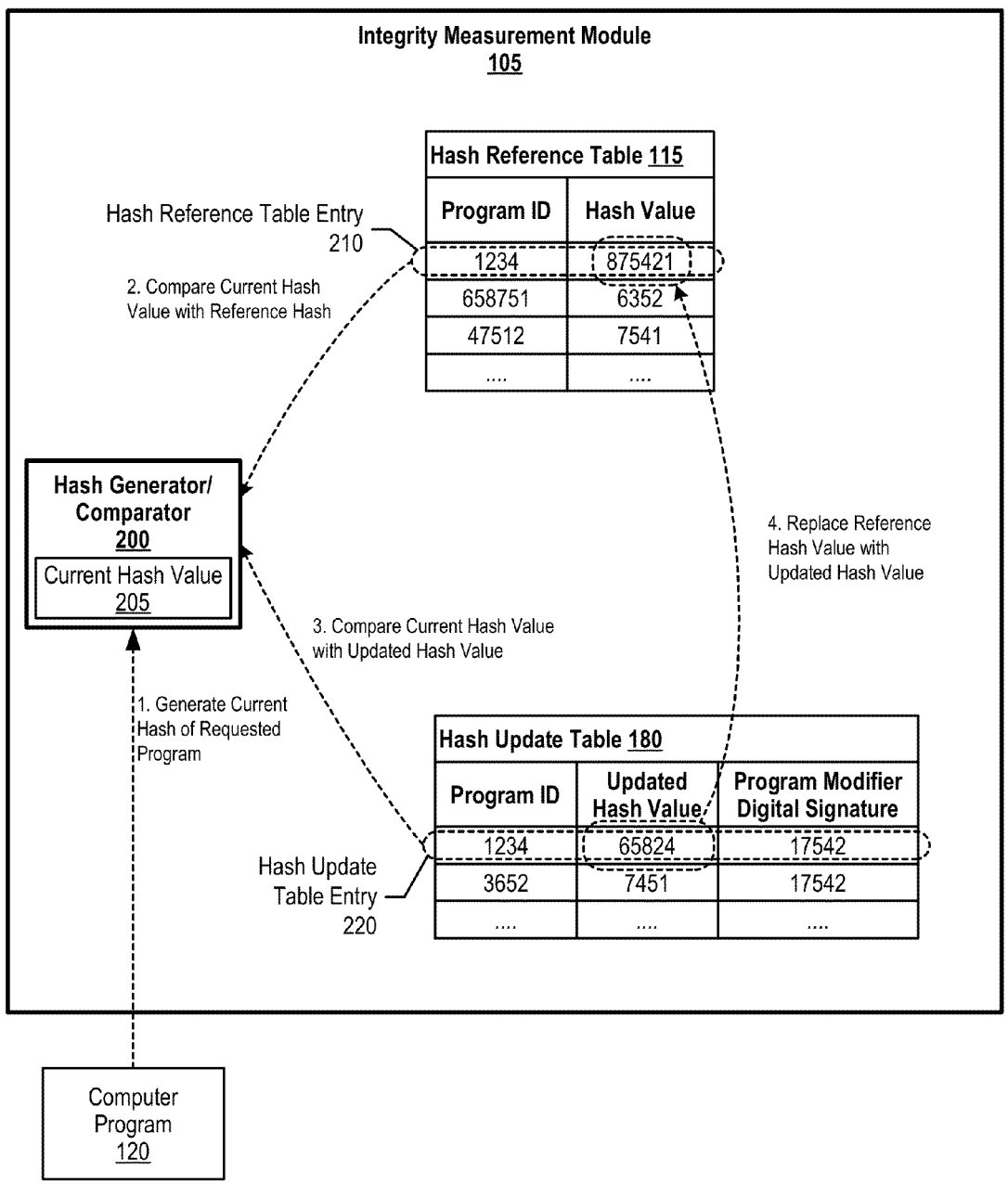
FIG. 2 is a diagram showing an integrity measurement module validating integrity of a computer program and replacing a reference hash value located in a hash reference table with an updated hash value.

FIG. 2 is a diagram showing an integrity measurement module validating integrity of a computer program and replacing a reference hash value located in a hash reference table with an updated hash value. Integrity measurement module 105 includes hash generator/comparator 200, which may be software-based, hardware-based, or a combination of hardware and software. When integrity measurement module 105 receives a request to execute computer program 120, hash generator/comparator 200 generates a current hash value of computer module 120 (current hash value 205), and compares current hash value 205 with a reference hash valued located in hash reference table entry 210. In one embodiment, hash generator/comparator 200 locates hash reference table entry 210 by comparing computer program 120's program identifier with the program identifier located in hash reference table entry 210 (1234).

When hash reference table entry 210's reference hash value (875421) does not match the current hash value, hash generator/comparator 200 accesses hash update table 180 to locate a table entry that includes the same program identifier as computer program 120. Hash generator/comparator 200 locates hash update table entry 220 and validates a digital signature included in hash update table entry 220. Next, hash generator/comparator 200 matches the updated hash value (65824) with computer program 120's current hash value. When hash update table entry 220's updated hash value matches the current hash value, hash generator/comparator 200 replaces the reference hash value in hash reference table entry 210 with the updated hash value in table entry 220. As such, the updated hash value becomes a new reference hash value. In turn, the next time that hash generator/comparator 200 generates a new current hash value of computer program 120 in response to receiving a program execution request, the new current hash value will match the new reference hash value stored in hash reference table entry 210.

Figure 3:
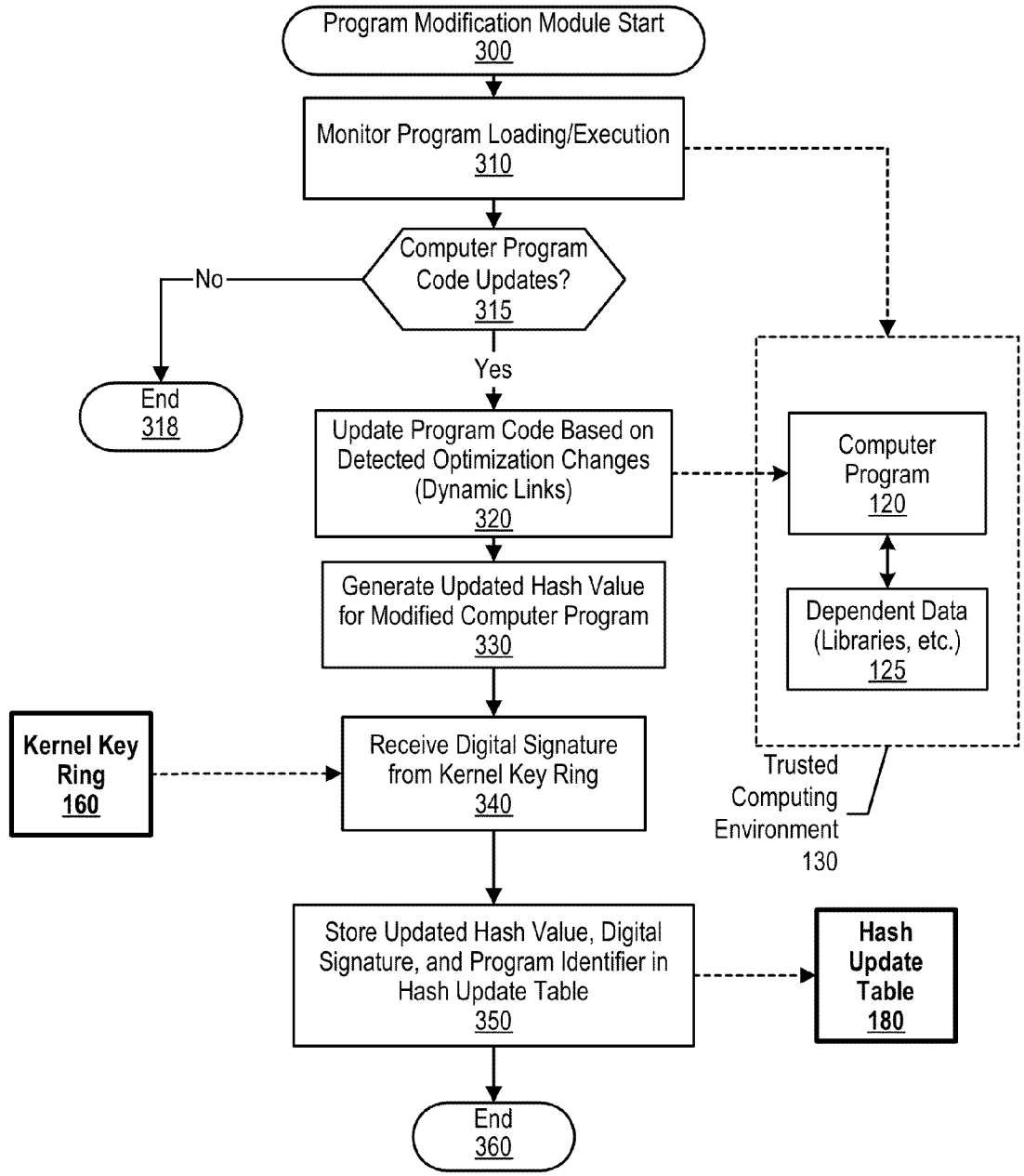
FIG. 3 is a flowchart showing steps taken in a program modification module updating a computer program's code and storing an updated hash value in a hash update table.

FIG. 3 is a flowchart showing steps taken in a program modification module updating a computer program's code and storing an updated hash value in a hash update table. Program modification module processing commences at 300, whereupon the program modification module (program modification module 140) monitors computer program 120's loading and execution in response to integrity measurement module 105 receiving a request to execute computer program 120. For example, computer system 100 may dynamically link computer program 120 and dependent data 125 (libraries) by temporarily modifying computer program 120's code. In one embodiment, a run-time loader performs the function of linking computer program 120 with dependent data 125. Computer program 120, dependent data 125, and program modification module 140 are included in trusted computing environment 125.

The program modification module determines whether computer program 120's code was updated during the loading/execution (decision 315). If computer program 120's code was not updated, decision 315 branches to the "No" branch, whereupon program modification module processing ends at 318.

On the other hand, if computer program 120's code was updated, decision 315 branches to the "Yes" branch, whereupon the program modification module modifies (step 320) computer program 120 based upon information (dynamic linking information) obtained from step 310. As such, during subsequent executions, computer program 120 foregoes dynamic linking and loads/executes faster.

At step 330, the program modification module generates an updated hash value for the "modified" computer program 120. The program modification module, at step 340, receives a digital signature from kernel key ring 160, thus ensuring a trusted digital signature. At step 350, the program modification module stores the updated hash value, the digital signature, and computer program 120's program identifier into a hash update table entry located in hash update table 180. Program modification module processing ends at 360.

Figure 4:
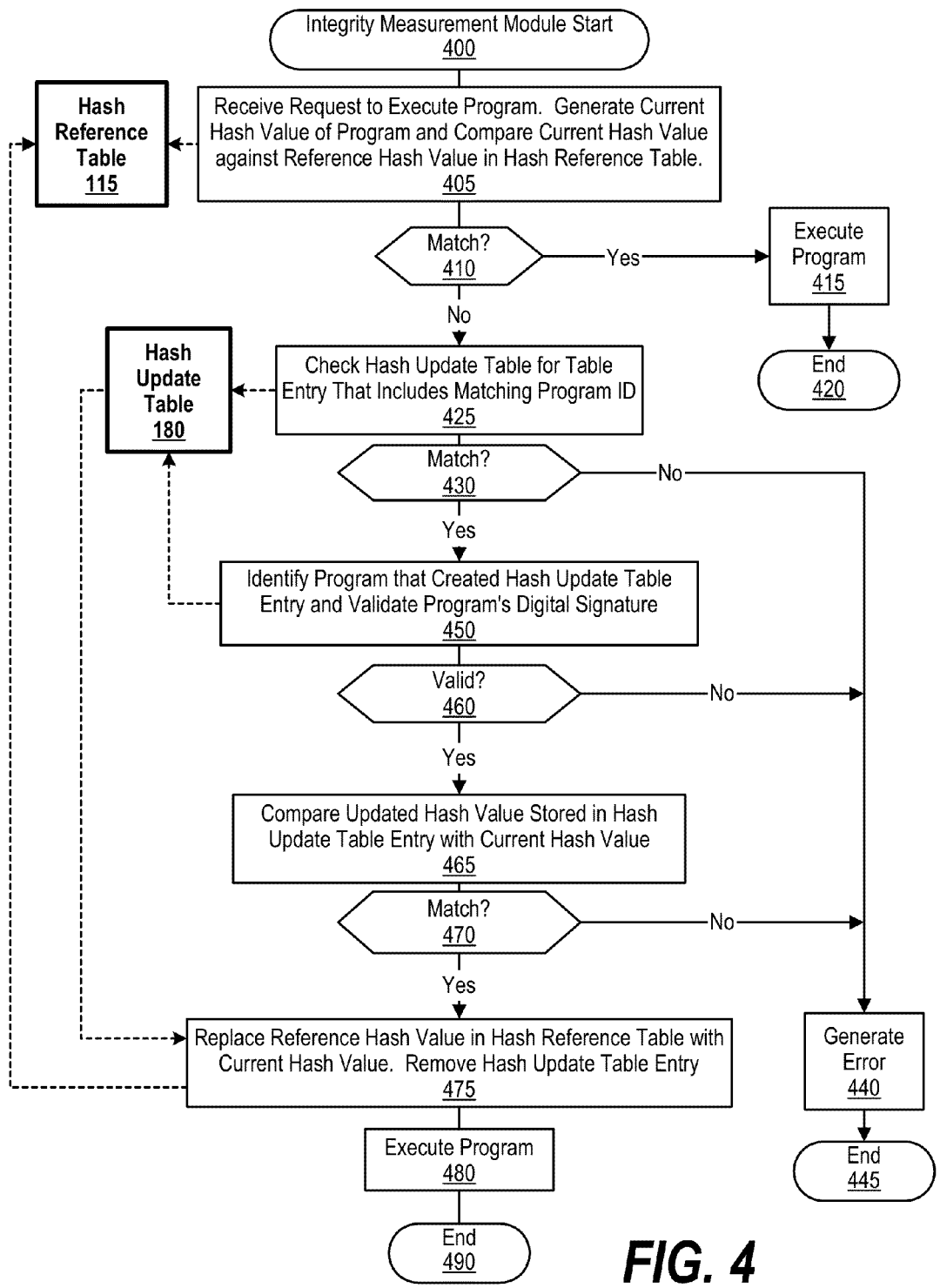
FIG. 4 is a flowchart showing steps taken in an integrity measurement module validating a modified computer program's integrity prior to executing the computer program.

FIG. 4 is a flowchart showing steps taken in an integrity measurement module validating a modified computer program's integrity prior to executing the computer program. Integrity measurement module processing commences at 400, whereupon the integrity measurement module (integrity measurement module 105) receives a request to execute a computer program. As such, the integrity measurement module generates a current hash value of the computer program and compares the current hash value with a reference hash value located in hash reference table 115 (step 405). In one embodiment, the integrity measurement module locates a hash reference table entry in hash reference table 115 by matching the program identifier of the requested program to a program identifier stored in the hash reference table entry.

The integrity measurement module determines whether the current hash value and the reference hash value match (decision 410). If the current hash value and the reference hash value match, decision 410 branches to the "Yes" branch, whereupon the integrity measurement module loads and executes the computer program at step 415, and integrity measurement module processing ends at 420.

On the other hand, if the current hash value does not match the reference hash value, decision 410 branches to the "No" branch, whereupon the integrity measurement module checks hash update table entries located in hash update table 180 for a table entry that includes a program identifier matching the requested computer program's program identifier (step 425). Referring back to FIG. 3, the program modification module added an updated hash value, a digital signature, and the program identifier into a hash update table entry when the program modification module generates an updated hash value in response to modifying the computer program.

The integrity measurement module determines whether hash update table 180 includes a table entry with a program identifier that matches the requested computer program's program identifier (decision 430). If hash update table 180 does not include a matching program identifier in one of the hash update table entries, decision 430 branches to the "No" branch, whereupon the integrity measurement module generates an error at step 440 and ends at 445.

On the other hand, if hash update table 180 includes a matching program identifier in one of hash update table 180's table entries, decision 430 branches to the "Yes" branch. At step 450, the integrity measurement module validates the digital signature located in the hash update table entry to ensure that the program modification module has not been compromised. For example, a malicious user may compromise the program modification module and cause the program modification module to generate untrusted hash update table entries.

If the integrity measurement module determines that the digital signature is invalid (e.g., a compromised program modification module), decision 460 branches to the "No" branch, whereupon the integrity measurement module generates an error at step 440 and ends processing at 445. On the other hand, if the integrity measurement module determines that the digital signature is valid, decision 460 branches to the "Yes" branch.

At step 465, the integrity measurement module compares the current hash value (generated at step 405) with the updated hash value stored in hash update table 180. If the current hash value does not match the updated hash value, decision 470 branches to the "No" branch, whereupon the integrity measurement module generates an error at step 440 and ends processing at 445.

On the other hand, current hash value matches the updated hash value, decision 470 branches to the "Yes" branch, whereupon the integrity measurement module replaces the reference hash value located in hash reference table 115 with the updated hash value stored in hash update table 180 (step 475, see FIG. 2 and corresponding text for further details). At step 480, the integrity measurement module executes the program and ends at 490.

Figure 5:
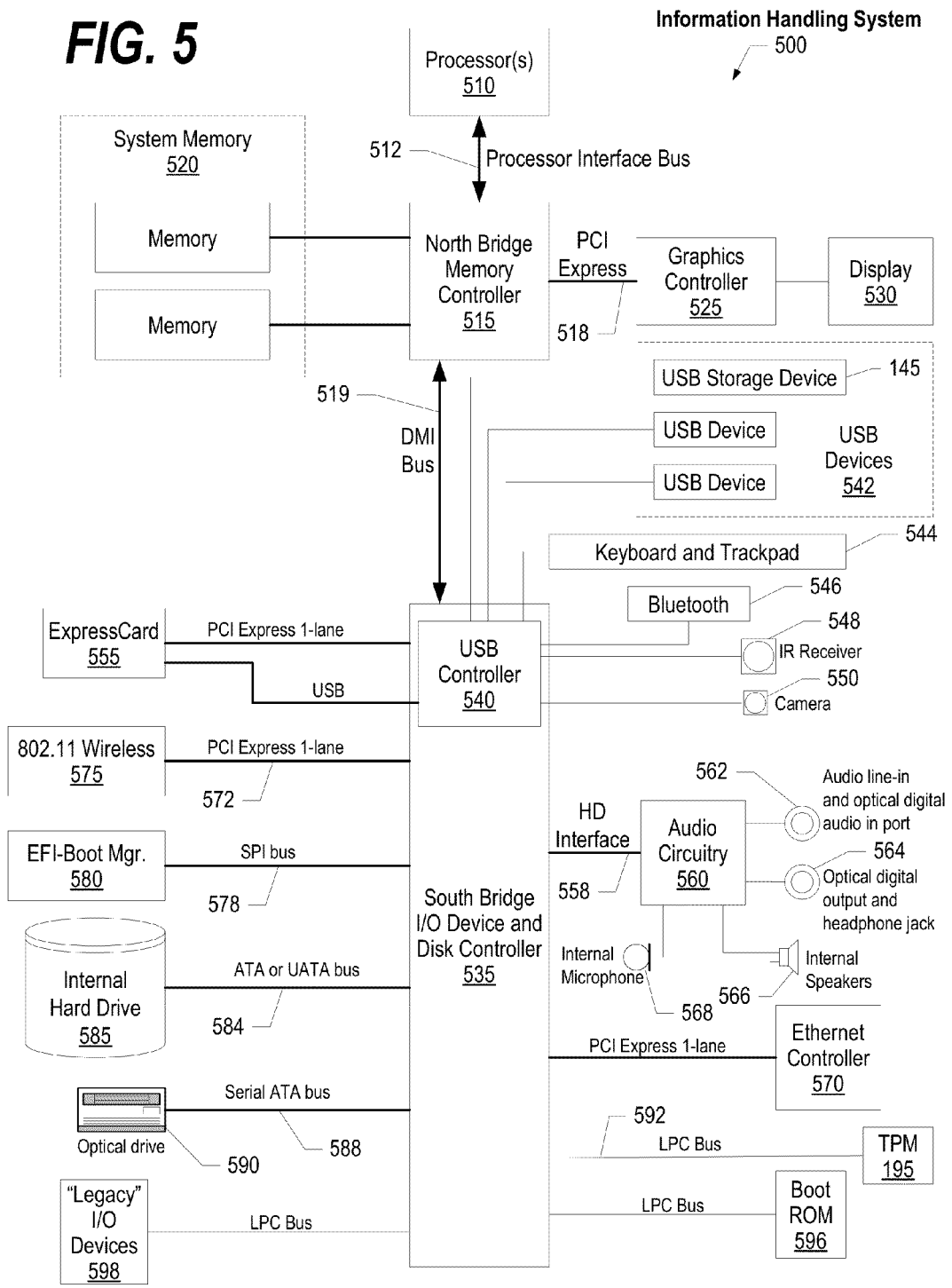
FIG. 5 is a block diagram of a data processing system in which the methods described herein can be implemented.

FIG. 5 illustrates information handling system 500, which is a simplified example of a computer system capable of performing the computing operations described herein. Information handling system 500 includes one or more processors 510 coupled to processor interface bus 512. Processor interface bus 512 connects processors 510 to Northbridge 515, which is also known as the Memory Controller Hub (MCH). Northbridge 515 connects to system memory 520 and provides a means for processor(s) 510 to access the system memory. Graphics controller 525 also connects to Northbridge 515. In one embodiment, PCI Express bus 518 connects Northbridge 515 to graphics controller 525. Graphics controller 525 connects to display device 530, such as a computer monitor.

Northbridge 515 and Southbridge 535 connect to each other using bus 519. In one embodiment, the bus is a Direct Media Interface (DMI) bus that transfers data at high speeds in each direction between Northbridge 515 and Southbridge 535. In another embodiment, a Peripheral Component Interconnect (PCI) bus connects the Northbridge and the Southbridge. Southbridge 535, also known as the I/O Controller Hub (ICH) is a chip that generally implements capabilities that operate at slower speeds than the capabilities provided by the Northbridge. Southbridge 535 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 596 and "legacy" I/O devices (using a "super I/O" chip). The "legacy" I/O devices (598) can include, for example, serial and parallel ports, keyboard, mouse, and/or a floppy disk controller. The LPC bus also connects Southbridge 535 to Trusted computing environment Module (TPM) 595. Other components often included in Southbridge 535 include a Direct Memory Access (DMA) controller, a Programmable Interrupt Controller (PIC), and a storage device controller, which connects Southbridge 535 to nonvolatile storage device 585, such as a hard disk drive, using bus 584.

ExpressCard 555 is a slot that connects hot-pluggable devices to the information handling system. ExpressCard 555 supports both PCI Express and USB connectivity as it connects to Southbridge 535 using both the Universal Serial Bus (USB) the PCI Express bus. Southbridge 535 includes USB Controller 540 that provides USB connectivity to devices that connect to the USB. These devices include webcam (camera) 550, infrared (IR) receiver 548, keyboard and trackpad 544, and Bluetooth device 546, which provides for wireless personal area networks (PANs). USB Controller 540 also provides USB connectivity to other miscellaneous USB connected devices 542, such as a mouse, removable nonvolatile storage device 545, modems, network cards, ISDN connectors, fax, printers, USB hubs, and many other types of USB connected devices. While removable nonvolatile storage device 545 is shown as a USB-connected device, removable nonvolatile storage device 545 could be connected using a different interface, such as a Firewire interface, etcetera.

Wireless Local Area Network (LAN) device 575 connects to Southbridge 535 via the PCI or PCI Express bus 572. LAN device 575 typically implements one of the IEEE 802.11 standards of over-the-air modulation techniques that all use the same protocol to wireless communicate between information handling system 500 and another computer system or device. Optical storage device 590 connects to Southbridge 535 using Serial ATA (SATA) bus 588. Serial ATA adapters and devices communicate over a high-speed serial link. The Serial ATA bus also connects Southbridge 535 to other forms of storage devices, such as hard disk drives. Audio circuitry 560, such as a sound card, connects to Southbridge 535 via bus 558. Audio circuitry 560 also provides functionality such as audio line-in and optical digital audio in port 562, optical digital output and headphone jack 564, internal speakers 566, and internal microphone 568. Ethernet controller 570 connects to Southbridge 535 using a bus, such as the PCI or PCI Express bus. Ethernet controller 570 connects information handling system 500 to a computer network, such as a Local Area Network (LAN), the Internet, and other public and private computer networks.

While FIG. 5 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted computing environment Module (TPM 595) shown in FIG. 5 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted computing environment Module (TPM) Specification Version 1.2." The TPM is a hardware security subsystem that may be incorporated into any number of information handling systems, such as those outlined in FIG. 6.

Figure 6:
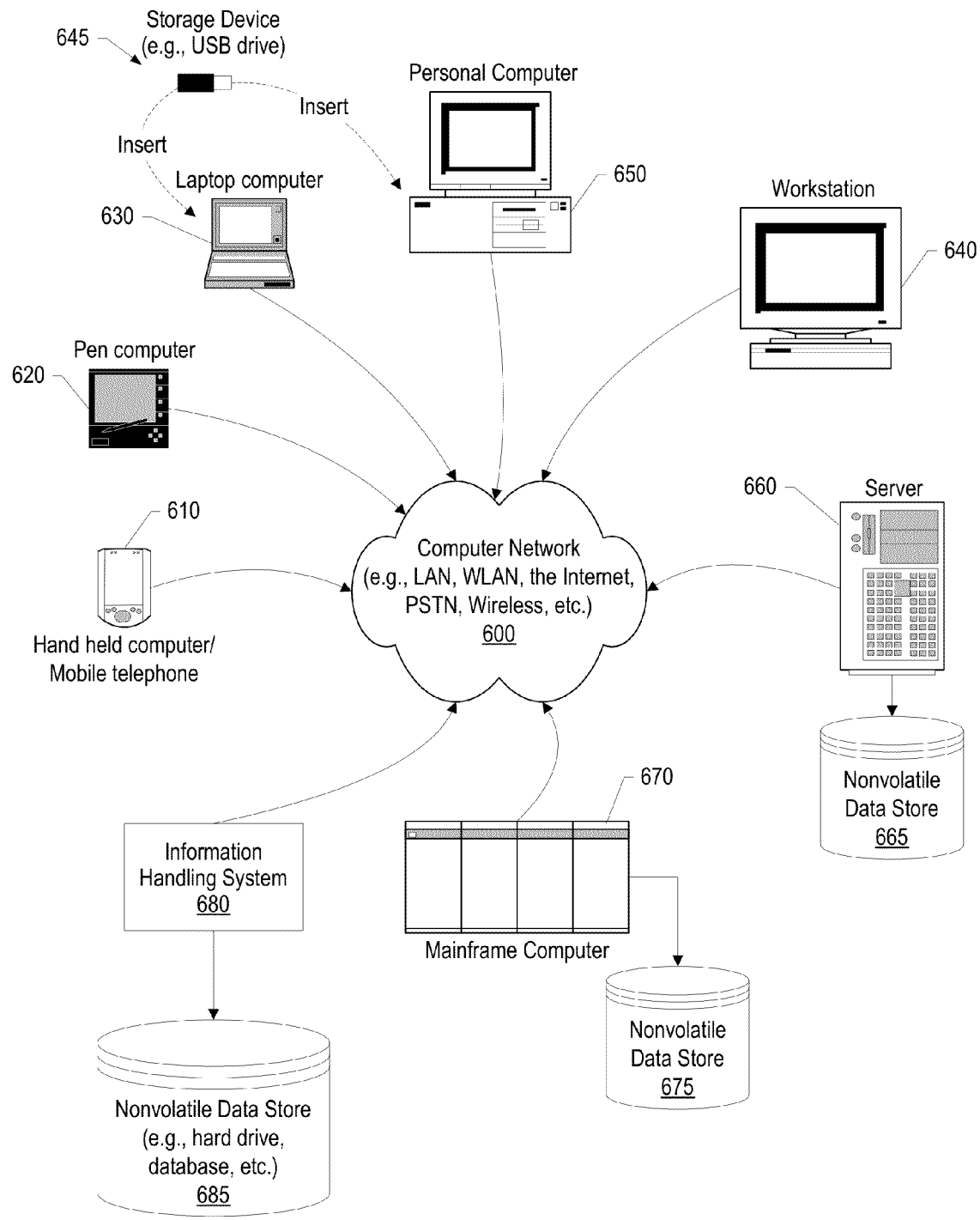
FIG. 6 provides an extension of the information handling system environment shown in FIG. 5 to illustrate that the methods described herein can be performed on a wide variety of information handling systems which operate in a networked environment.

FIG. 6 provides an extension of the information handling system environment shown in FIG. 5 to illustrate that the methods described herein can be performed on a wide variety of information handling systems that operate in a networked environment. Types of information handling systems range from small handheld devices, such as handheld computer/mobile telephone 610 to large mainframe systems, such as mainframe computer 670. Examples of handheld computer 610 include personal digital assistants (PDAs), personal entertainment devices, such as MP3 players, portable televisions, and compact disc players. Other examples of information handling systems include pen, or tablet, computer 620, laptop, or notebook, computer 630, workstation 640, personal computer system 650, and server 660. Other types of information handling systems that are not individually shown in FIG. 6 are represented by information handling system 680. As shown, the various information handling systems can be networked together using computer network 600. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems.

Many of the information handling systems include nonvolatile data stores, such as hard drives and/or nonvolatile memory. Some of the information handling systems shown in FIG. 6 depicts separate nonvolatile data stores (server 660 utilizes nonvolatile data store 665, mainframe computer 670 utilizes nonvolatile data store 675, and information handling system 680 utilizes nonvolatile data store 685). The nonvolatile data store can be a component that is external to the various information handling systems or can be internal to one of the information handling systems. In addition, removable nonvolatile storage device 545 can be shared among two or more information handling systems using various techniques, such as connecting the removable nonvolatile storage device 545 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method of verifying computer program integrity on a computer system, the method comprising:
   modifying a computer program, by one or more processors, based upon one or more changes to the computer program resulting from dynamically linking the computer program to one or more libraries;
   generating an updated hash value of the computer program subsequent to the modifying;
   generating, a current hash value of the computer program in response to receiving a request to execute the computer program;
   determining that the current hash value fails to match a reference hash value, wherein the reference hash value was generated from the computer program prior to the modification of the computer program;
   matching the current hash value to the updated hash value; and
   executing, by one or more of the processors, the computer program in response to matching the current hash value to the updated hash value.

2. The method of claim 1 wherein:
   an integrity measurement module generates the current hash value and the reference hash value;
   a program modification module modifies the computer program and generates the updated hash value; and the computer program and the program modification module are included in a trusted computing environment that is managed by the integrity measurement module.

3. The method of claim 2 further comprising:
receiving a digital signature at the program modification module from a kernel key ring executing on the computer system; and
storing, by the program modification module, the updated hash value and the digital signature in a hash update table.

4. The method of claim 3 wherein, prior to matching the first current hash value to the updated hash value, the method further comprises:
validating, by the integrity measurement module, the digital signature stored in the hash update table; and
performing the matching of the current hash value to the updated hash value in response to the validation of the digital signature.

5. The method of claim 1 wherein the modification is a binary update to the computer program.

6. The method of claim 1 further comprising:
replacing the reference hash value located in a hash reference table with the updated hash value located in a hash update table in response to matching the current hash value to the updated hash value.

7. The information handling system of claim 1 wherein the information handling system further comprises:
an integrity measurement module that generates the current hash value and the reference hash value;
a program modification module that modifies the computer program and generates the updated hash value; and
wherein the computer program and the program modification module are included in a trusted computing environment that is managed by the integrity measurement module.

8. The information handling system of claim 7 wherein the set of computer program instructions, when executed by at least one of the processors, performs additional actions comprising:
receiving a digital signature at the program modification module from a kernel key ring executing on the information handling system; and
storing, by the program modification module, the updated hash value and the digital signature in a hash update table.

9. The information handling system of claim 8 wherein, prior to matching the current hash value to the updated hash value, the set of computer program instructions, when executed by at least one of the processors, performs additional actions comprising:
validating, by the integrity measurement module, the digital signature stored in the hash update table; and
performing the matching of the current hash value to the updated hash value in response to the validation of the digital signature.

10. An information handling system comprising:
one or more processors;
a memory coupled to at least one of the processors;
a display accessible to at least one of the processors;
a set of computer program instructions stored in the memory and executed by at least one of the processors in order to perform actions of:
modifying a computer program based upon one or more changes to the computer program resulting from dynamically linking the computer program to one or more libraries;
generating an updated hash value of the computer program subsequent to the modifying;
generating a current hash value of the computer program in response to receiving a request to execute the computer program;
determining that the current hash value fails to match a reference hash value, wherein the reference hash value was generated from the computer program prior to the modification of the computer program;
matching the current hash value to the updated hash value; and
executing, by one or more of the processors, the computer program in response to matching the current hash value to the updated hash value.

11. The information handling system of claim 10 wherein the modification is a binary update to the computer program.

12. The information handling system of claim 10 wherein the set of computer program instructions, when executed by at least one of the processors, performs additional actions comprising:
replacing the reference hash value located in a hash reference table with the updated hash value located in a hash update table in response to matching the current hash value to the updated hash value.

13. A computer program product stored in a computer readable storage medium, comprising computer program code that, when executed by an information handling system, causes the information handling system to perform actions comprising:
modifying a computer program based upon one or more changes to the computer program resulting from dynamically linking the computer program to one or more libraries;
generating an updated hash value of the computer program subsequent to the modifying;
generating a current hash value of the computer program in response to receiving a request to execute the computer program;
determining that the current hash value fails to match a reference hash value, wherein the reference hash value was generated from the computer program prior to the modification of the computer program;
matching the current hash value to the updated hash value; and
executing, by one or more of the processors, the computer program in response to matching the current hash value to the updated hash value.

14. The computer program product of claim 13 wherein the computer program code, when executed by the information handling system, causes the information handling system to perform additional actions comprising:
receiving a digital signature from a kernel key ring executing on the information handling system; and
storing the updated hash value and the digital signature in a hash update table.

15. The computer program product of claim 14 wherein, prior to matching the current hash value to the updated hash value, the computer program code, when executed by the information handling system, causes the information handling system to perform additional actions comprising:
performing the matching of the current hash value to the updated hash value in response to the validation of the digital signature.

16. The computer program product of claim 13 wherein the modification is a binary update to the installed computer program.

17. The computer program product of claim 13 wherein the computer program code, when executed by the information handling system, causes the information handling system to perform additional actions comprising:

replacing the reference hash value located in a hash reference table with the updated hash value located in a hash update table in response to matching the current hash value to the updated hash value.

\* \* \* \* \*